United States Patent [19]

Lamper et al.

[11] Patent Number: 5,055,850
[45] Date of Patent: Oct. 8, 1991

[54] WAVEFORM GENERATOR

[75] Inventors: David Lamper, St. Charles; Thomas L. Grettenberg, St. Louis, both of Mo.

[73] Assignee: Electronics & Space Corporation, St. Louis, Mo.

[21] Appl. No.: 576,996

[22] Filed: Sep. 4, 1990

[51] Int. Cl.⁵ ............................................. G01S 13/89
[52] U.S. Cl. ...................................... 342/201; 342/25
[58] Field of Search ................................ 342/25, 201

[56] References Cited

U.S. PATENT DOCUMENTS

| 4,068,178 | 1/1978 | Tunzi | 328/14 |
| 4,123,719 | 10/1978 | Hopwood et al. | 328/155 |
| 4,142,245 | 2/1979 | Baron | 364/900 |
| 4,200,872 | 4/1980 | Sifferlen et al. | 322/201 |
| 4,724,418 | 2/1988 | Weindling | 342/25 |

Primary Examiner—Mark Hellner
Attorney, Agent, or Firm—Polster, Polster and Lucchesi

[57] ABSTRACT

A waveform generator (12') is responsive to a reference clock signal input for producing an output waveform which is a linear FM waveform. A reference clock signal is supplied to the generator which performs a double integration to obtain the phase of the output signal. The phase resulting from the double integration is used to obtain the sine of the phase using a lookup table. The sine of the phase is input to digital-to-analogue (D/A) converter, and the output from the D/A converter is filtered using a bandwidth matched to the bandwidth of the transmitted signal. The generator is useful in radar systems for area mapping and target identification.

20 Claims, 6 Drawing Sheets

WAVEFORM GENERATOR

BACKGROUND OF THE INVENTION

This invention relates to waveform generators for use in radar systems, and more particularly, to a waveform generator for use with an improved radar system to generate a waveform by which compensating a received radar signal for the pulse-to-pulse change in signal delay, and the pulse-to-pulse change in phase and frequency, both of which occur when an object producing a reflected signal is moving relative to the radar platform, is achieved.

As is known in the art, coherent radar systems operate to detect a target by using the amplitude, frequency, and phase of a signal reflected by the object. In synthetic aperture radar systems (SAR), the platform on which the radar system is based may move an appreciable distance between the transmission of one radar pulse and the next. In addition, if the platform is based on a moving object (aircraft, ship or land-based vehicle), movement of the platform due to turbulence, wave motion, vehicle swaying, etc. creates another factor which must be taken into account to obtain accurate radar information. It is typical in such systems that successive pulse returns are combined when the signal is processed to form a coherent array of pulse returns. There is therefore both a time delay, a doppler frequency shift, and a phase shift between the various signal returns and these must be taken into account for proper signal processing. There are thus at least two forms of signal compensation which should be implemented in a coherent radar system to provide a high degree of system accuracy; i.e. range closure compensation, and platform motion or doppler phase and frequency compensation. In our co-pending U.S. patent application Ser. No. 07/577,147, an improved radar system to effect these compensations is described. A waveform generator for use in such a system is described herein.

SUMMARY OF THE INVENTION

Among the several objects of the present invention may be noted the provision of a waveform generator; the provision of such a generator for generating a linear FM waveform; the provision of such a generator which is useful in coherent radar systems; the provision of such a generator for providing an output signal by which compensation for both movement of a target object relative to a radar platform and to motion of the platform due to turbulence, swaying, etc. is readily accomplished; the provision of such a generator which permits dissimilar pulse modulations to be transmitted on successive pulses; the provision of such a generator to perform a double integration of the second derivative of the phase of a waveform to be transmitted; and, the provision of such a generator in which the components of each stage of the double integration of the waveform phase second derivative can be combined in any one of a number of different sequences.

In accordance with the invention, generally stated, a waveform generator is responsive to a reference clock signal input to produce an output waveform. The reference signal is supplied as an input to the generator. The generator performs a double integration to obtain the phase of the output signal. The output signal phase and the results from each integration can be executed in any sequence to produce a resultant waveform. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
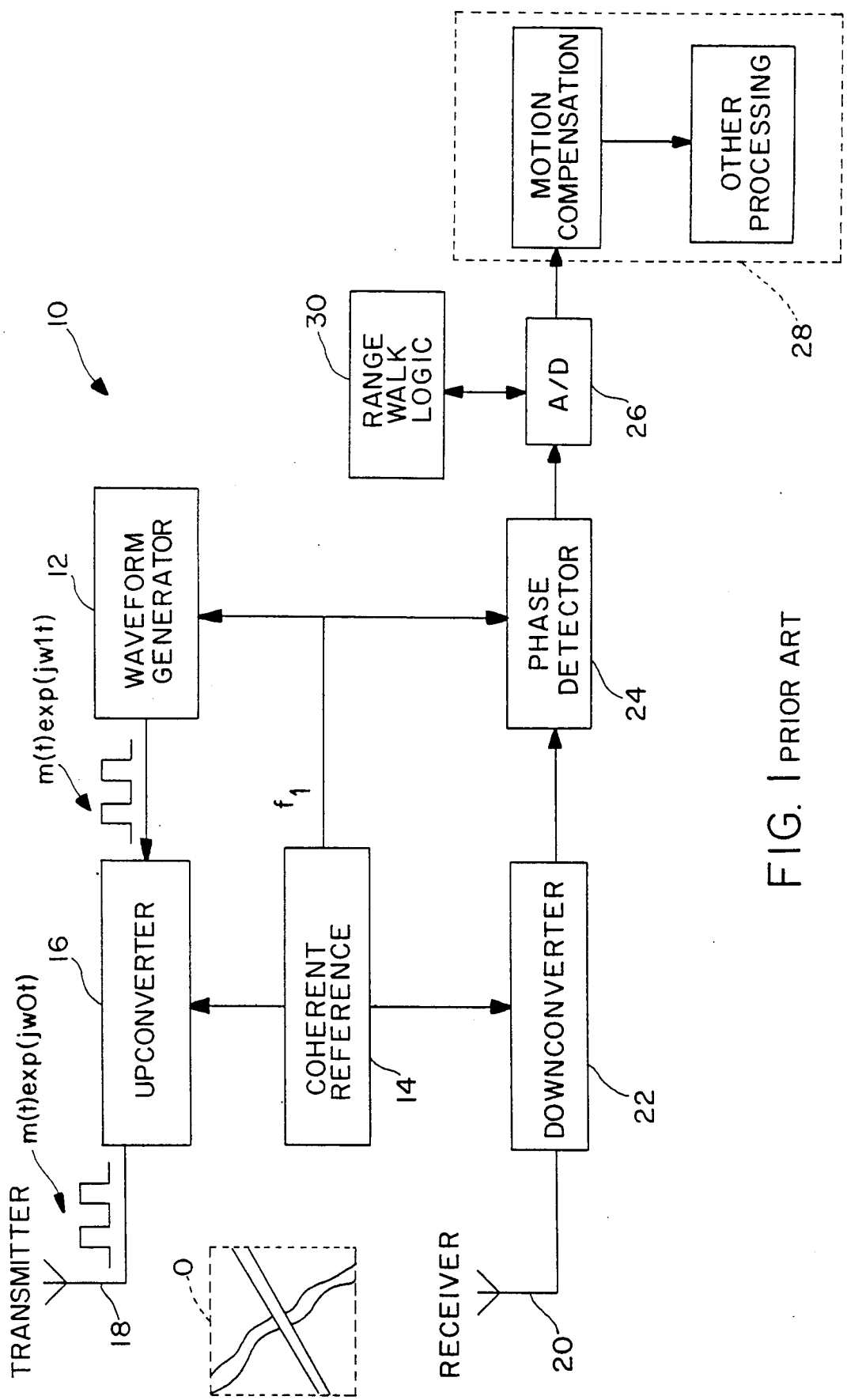
FIG. 1 is a block diagram of a coherent radar system.

Referring to the drawings, a coherent radar transmitter and receiver system 10 is shown in block diagram form in FIG. 1. A waveform generator 12 produces a complex, modulated pulse waveform m(t) on a coherent carrier frequency signal $f_1$. The waveform generator is run from a clock signal which is supplied by a frequency generator 14. Waveform $m(t)exp(jw_1t)$ is supplied to an upconverter 16 for conversion to a coherent frequency signal $f_0$. This is the frequency transmitted by the system's transmitter 18 and the transmitted signal is referred to as s(t). A signal reflected by an object O (for example, a point on a bridge within an area being mapped by the radar) is received by a receiver 20 of the system. This reflected signal is referred to as r(t), and is supplied to a downconverter 22, and then to a phase detector 24. After phase detection, the signal is provided to an analog-to-digital (A/D) converter 26. Converter 26 operates at a preset internal clock rate and performs a sampling operation on pulses in the pulse train comprising the received signal. From converter 26, the received signal is supplied to a signal processor 28.

For the system of FIG. 1, the transmitted signal may be mathematically represented as $$s(t) = m(t)exp(jW_0t)$$

where $W_0 = 2(\pi)f_0$. The received signal from object O is $s(t-T)$ where T is a function of time if the object (or reflector) is moving relative to radar system 10. Delay T is expandable into a Taylor's series which is evaluated at the leading edge of a received pulse. Thus, $$T = T_0 + T'(t - T_0)$$

where T' is the derivative of T at $t = T_0$. The received signal r(t), at the input of converter 26, is mathematically expressed as $$r(t) = m(t - T_0)exp(-jW_0T_0 - jW_0T'(t - T_0)).$$

For SAR mode processing, or for target (object O) identification, compensation is made to received signal r(t). Compensation to the doppler phase and frequency components of the signal is called "focusing" Compensation in the signal equation for the changing delay-TOrelative to a converter sampling window center ($T_1$) is called "range walk" compensation and is performed by a range walk logic unit 30 connected to converter 26. For simplicity, the phase at the start of a received pulse is $$P_0 = W_0 T_0$$

and the doppler radian frequency is $$W_d = -W_0 T$$

This allows the received signal at converter 26 to be expressed as $$r(t) = m(t-T_0) exp(-jP_0 + jW_d(t-T_0))$$

In low duty factor radar systems, i.e. where $W_d T_p < \pi$ ($T_p$ being the pulse width), doppler frequency shift within the pulse is neglected. This means focusing calculations performed in signal processor 28 need only correct the starting phase of successive pulses in the received signal pulse train.

Figure 2:
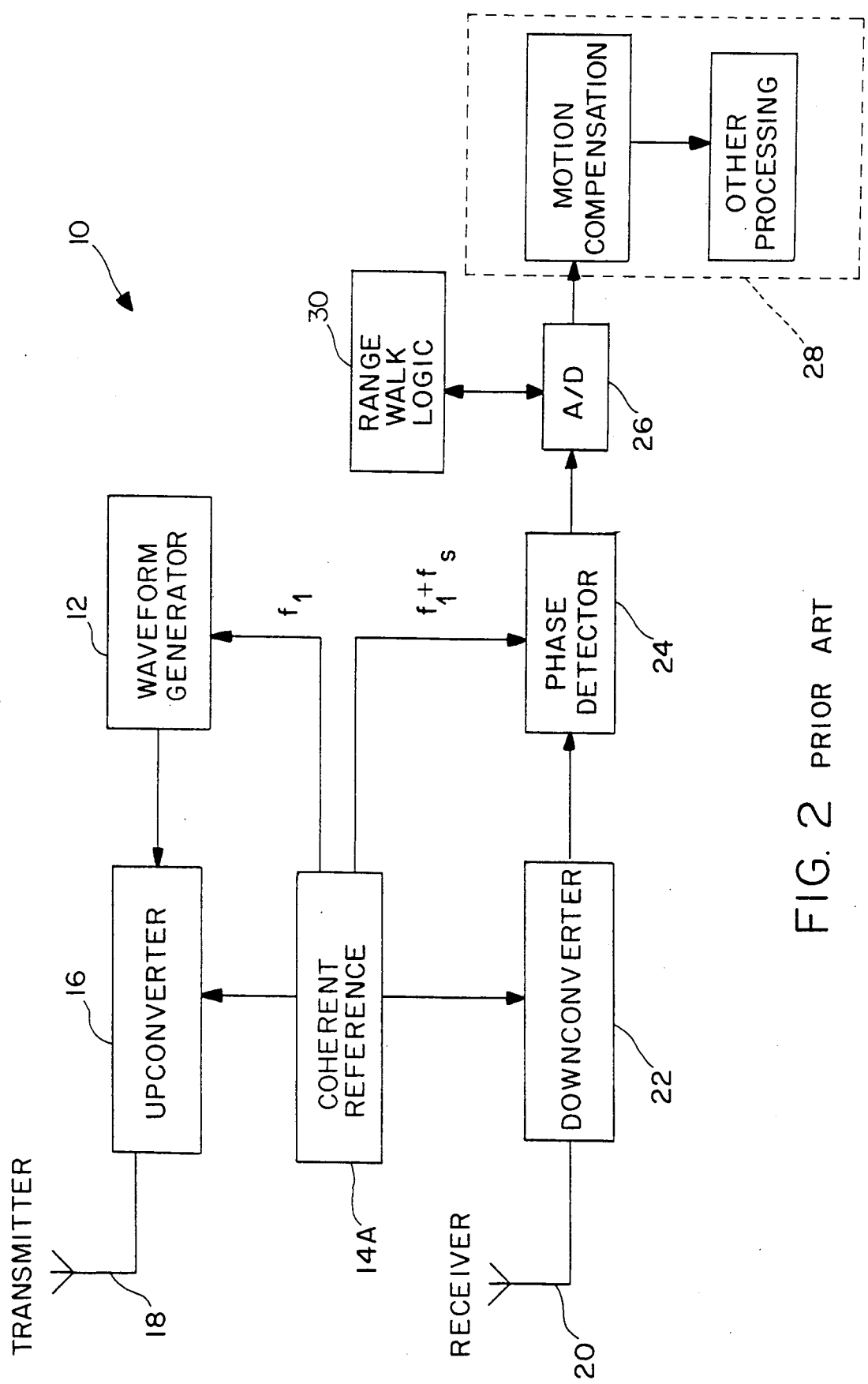
FIG. 2 is a block diagram of a coherent radar system with a reference offset.
Figure 3:
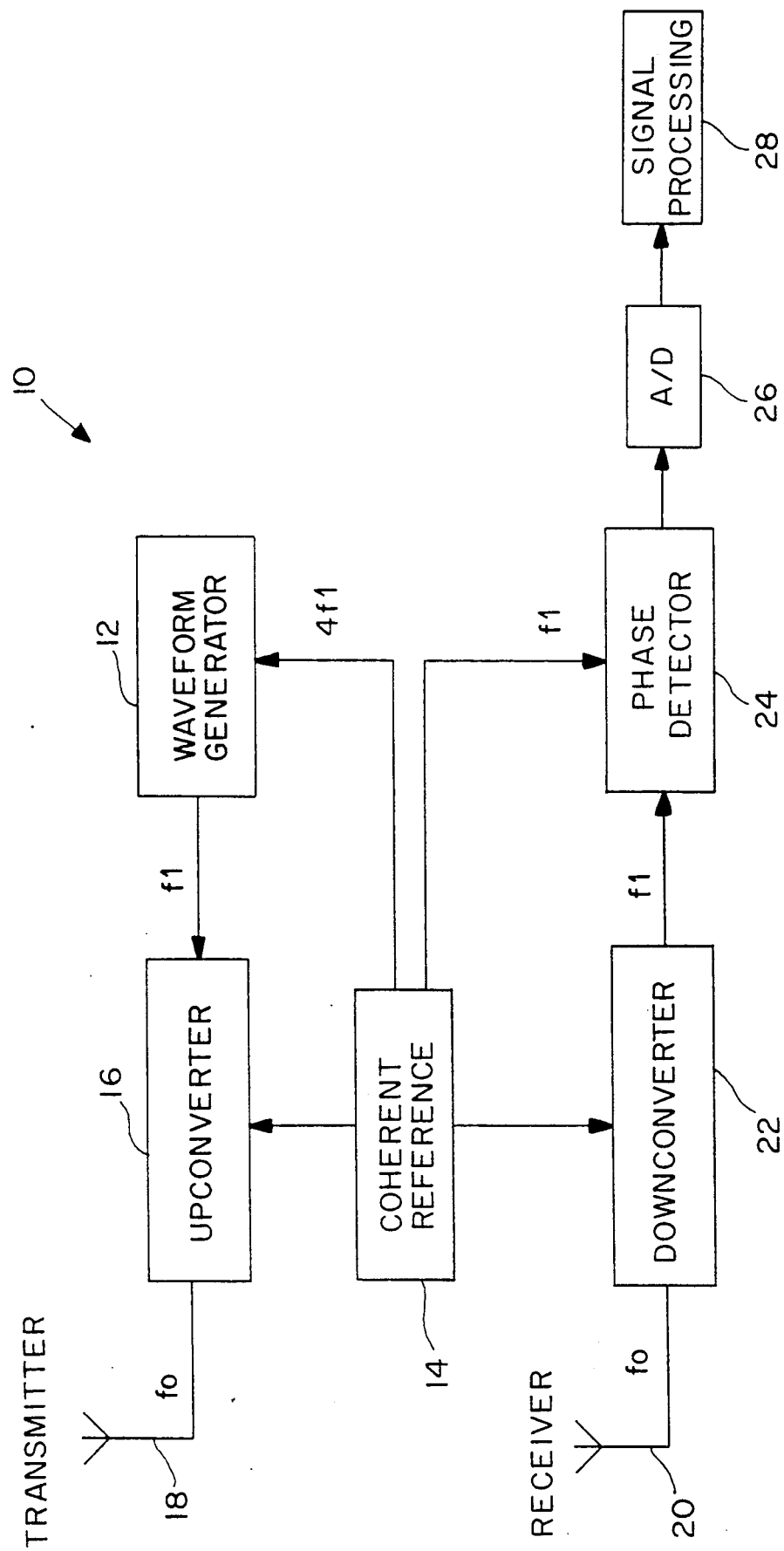
FIG. 3 is a block diagram of an improved coherent radar system.
Figure 4:
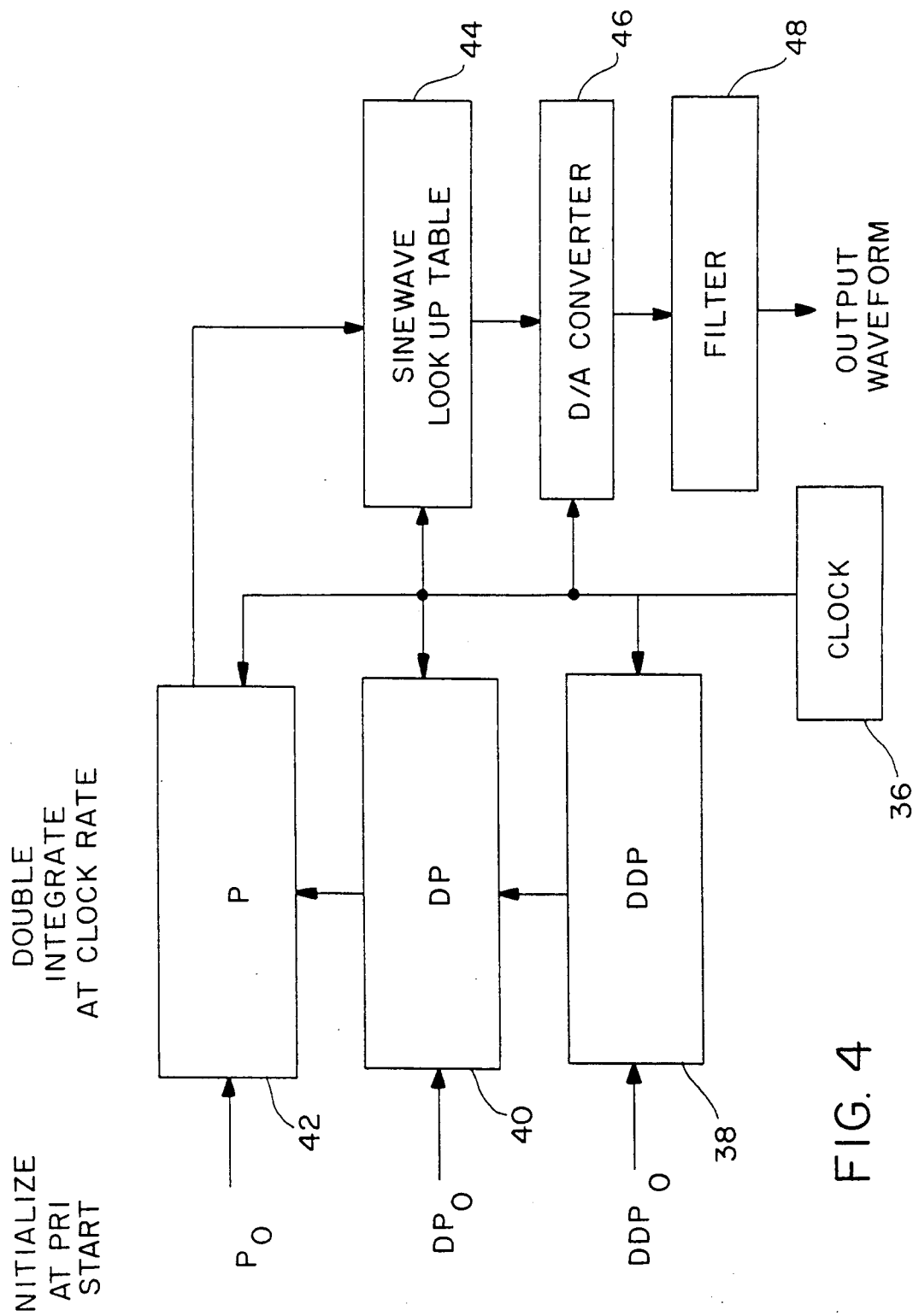
FIG. 4 is a block diagram of a waveform generator of the present invention for use with the radar system of FIG. 3.
Figure 5:
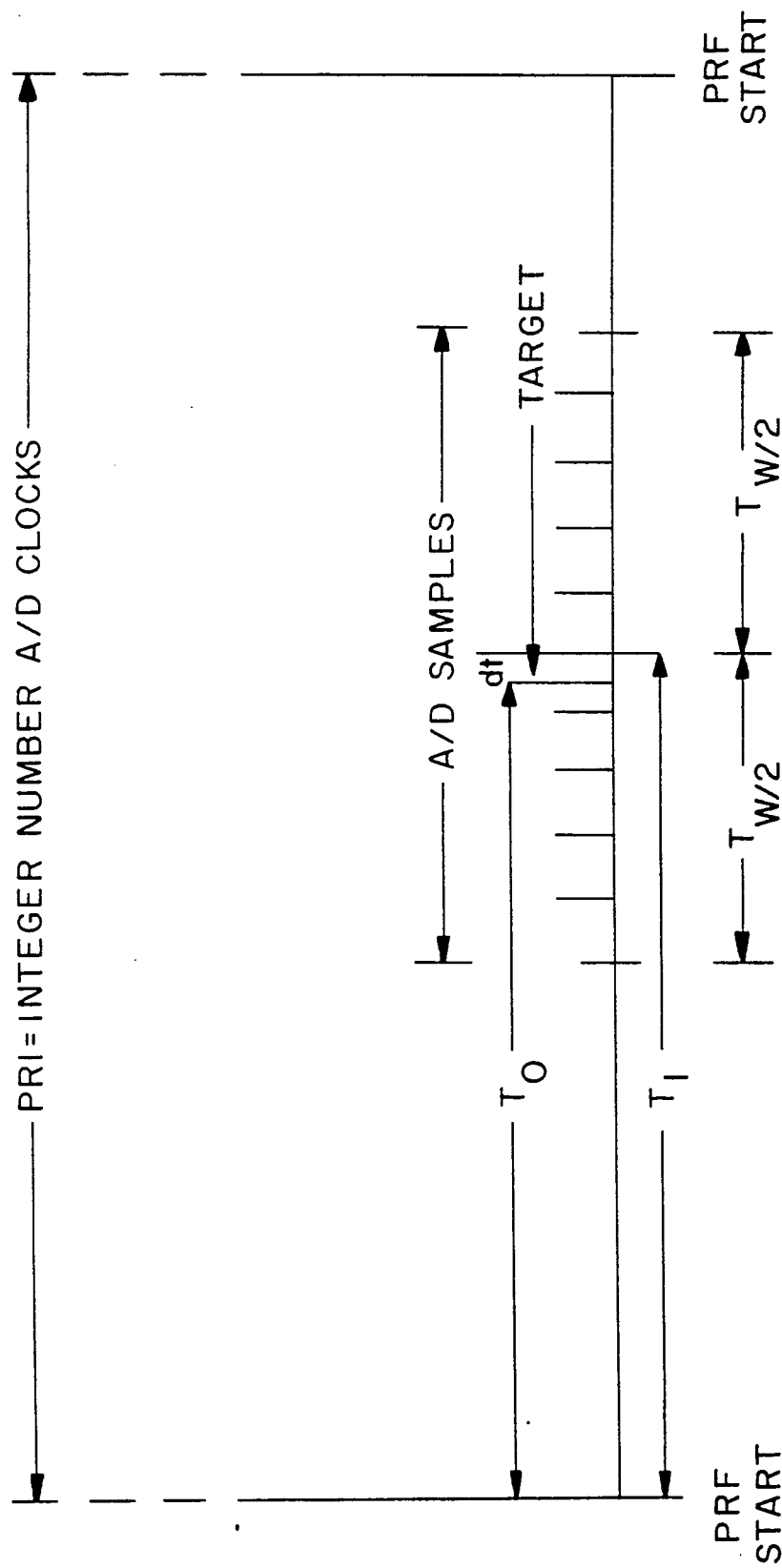
FIG. 5 is a timing diagram illustrating the "range walk" compensated for by the improved radar system.

Referring to FIG. 2, if doppler frequency for the pulses in the received pulse train cannot be neglected, a coherent reference 14a within radar system 10 may add a frequency synthesizer offset $f_s$ to the reference signal supplied phase detector 24. Whereas the coherent reference frequency $f_1$ was supplied to both generator 12 and detector 24 in system 10 of FIG. 1; now, the reference frequency supplied to the phase detector is $f_1 + f_s$. The received signal at converter 26 is now mathematically expressed as $$r(t) = m(t-T_0) exp(-jP_2 + j(W_d - W_s)(t-T_0))$$

where $$P_2 = P_0 + W_s T_0 + P_1,$$

$P_1$ being the phase of the frequency synthesizer offset at $t=0$. This arrangement allows the frequency synthesizer offset to have a nominal value of doppler frequency during the coherent array. Also, the frequency difference ($W_d - W_s$) can be neglected during the pulse. As a result, the signal at converter 26, regardless of whether or not doppler frequency offset is neglected, is $$r(t) = m(t-T_0) exp(-jP).$$

Signal processor 28 compensates for the starting phase P on each output signal from converter 26 that is processed.

As part of its analog-to-digital conversion operation, converter 26 samples, at set intervals, the signal supplied it by detector 24. Range walk compensation is accomplished in logic unit 30 by adjusting this set of sampled values. The round trip delay of a pulse to object 0 from the radar platform falls within the A/D delay sampling window. The center of the window is $T_1$, and its width $T_w$. The value $T_1$ is determined by rounding a computed value of $T_0$ to a least significant bit of $$dt = (1/n)(\text{converter 26's clock interval}).$$

where dt is the delay stabilization accuracy, and n the number of times the clock rate at which the stabilization circuitry runs.

After rounding, the signal at the output of inverter 26 is $$r(T_1) = m(T_1 - T_0) exp(-jP)$$

To attain a desired delay stabilization accuracy dt, the clock rate, particularly in high resolution radar systems may be so high, as to be difficult to implement.

Whereas pulse modulation m(t) is the same on successive transmitted pulses in most radar systems, with the improved radar system described in co-pending U.S. patent application Ser. No. 07/577,147, this is no longer a requirement. Now, by generating waveforms using a method of direct digital synthesis, precise computations of both transmitted pulse phase and transmitted pulse frequency can be obtained for each successive pulse. Referring again to FIG. 1, the pulse modulation m(t) for each transmitted pulse is $$m(t) = a(t) exp(jP_0 - jW_d(t))$$

where a(t) represents the modulation factor and is given by the equation $$a(t) = exp(jP(t)),$$

with P(t) being any desired phase modulation function which could be the same for each pulse. In the improved radar system described in co-pending U.S. patent application Ser. No. 07/577,147, the received signal at the input to converter 26 is given by $$r(t) = a(t - T_0)$$

and focusing computations are no longer required to be performed in signal processor 28. Further, because doppler phase shift compensation has already been accomplished within each pulse, the frequency synthesizer feature of the coherent reference 14' shown in FIG. 2 is no longer required.

Not only does this technique solve the need for doppler phase shift compensation, but also the need for range walk compensation. $T_0$ is computed for each pulse transmitted. If $T_1$ is set equal to $T_0$ (rounded up to the nearest clock time of converter 26), then the difference between the two values is given as $dt = T_1 - T_0$. The modulation factor a(t) is then computed as $$a(t) = exp(jP(t - dt))$$

The output signal from converter 26 to signal processor 28 is $$r(T) = exp(jP(T_1 - dt - T_0)),$$

or $$r(T) = exp(jP(O)).$$

It will be understood that while range stabilization accuracy using this method is theoretically perfect, errors involved in implementing a waveform generator capable of implementing the above steps will limit its performance. However, it is important to note that the clock required to generate $T_1$ does not have to operate faster than the converter 26 clock rate, even in high resolution radar systems, in order to accomplish range walk compensation.

The method may also be implemented with a transmitter for use in stretch waveform systems. In such a transmitter, a linear FM phase modulation is used. This has the form $$P(t) = A + B(t) + Ct^2/2$$

where A, B, and C are constants. With both focus and range walk compensation on transmit, the signal x(t) received at receiver 20" is expressed as $$x(t) = \exp(jW_0 t + jP(t - T_1))$$

Downconverter 23" now down converts this signal using the conversion factor $\exp(j(W_0 - W_2)t)$ to provide an output $$r(t) = \exp(jW_2 t + jP(t - T_1))$$

Figure 6:
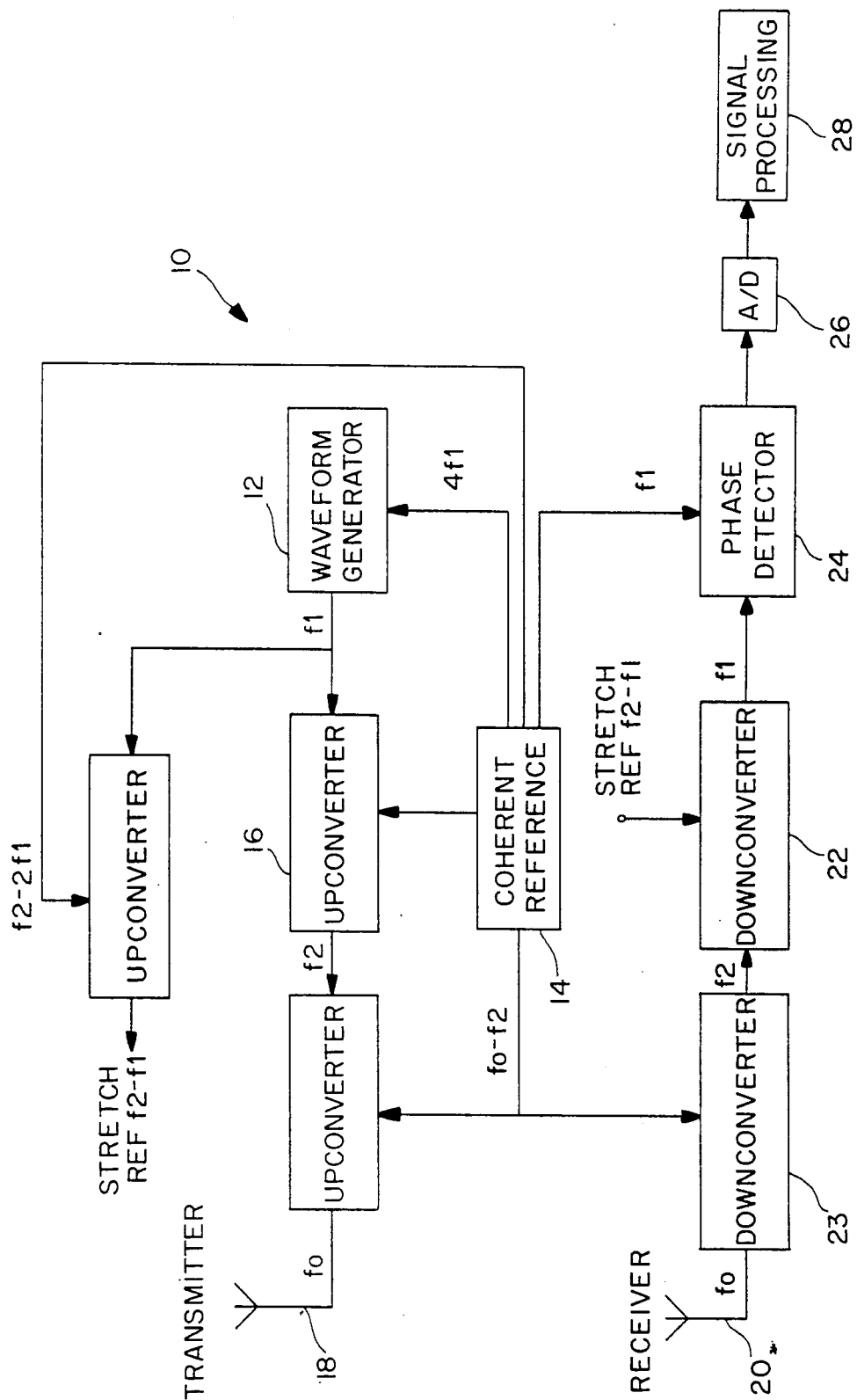
FIG. 6 is a block diagram for a second embodiment of the improved radar system.

Referring to FIG. 6, an improved radar apparatus 10" includes a waveform generator 12" of the present invention. Generator 12" is used to generate a linear FM reference waveform which is mixed with the received signal reflected from object O to produce the phase detector 24" output signal supplied to the input of A/D converter 26". If, for example, generator 12" is started by counting down the converter 26" clock, the reference waveform and the converter will both be started at $T_2 = T_1 - (T_w/2)$, $T_w/2$ being a predetermined number of converter 26' clock pulses ahead of reference delay $T_1$. If $$T_2 < t < T_1 + T_p + (T_w/2),$$

then reference waveform y(t) can be expressed as $$y(t) = \exp(jW_2 t + jP(t - T_1))$$

and the output of converter 26", from the stabilization point, will be at dc. The output z(t) of converter 26", for a received signal having the same doppler phase shift and a delay of $TO + dT$, will then be $$\begin{aligned} z(t) &= \exp(jP(t - T_1 - dT) - jP(t - T_1)), \text{ or} \\ &= \exp(-jBdT - jCdT(t - T_1) + jCdT^2/2) \end{aligned}$$

This corresponds to a sine wave varying in frequency from an upper frequency limit of $CT_w/2$ for $dT = -T_w/2$, to a lower frequency limit of $-CT_w/2$ for $dT = T_w/2$. For any value of dT, e.g. $t = T_1$, the phase of the sine wave for any fixed sampling point in converter 26" is constant for each received pulse. This means the focusing and range closure compensations have corrected the return signals from all ranges at the same time. As a consequence, the improved radar system 10" of FIG. 6 can perform all the appropriate mapping functions of previous radar systems such as those of FIGS. 1 and 2 without need of a range walk logic unit or motion compensation unit such as these systems require.

The waveform s(t) produced by generator 12', both for focus on transmit and range closure on transmit, is given as $$\begin{aligned} s(t) &= \exp(jW_1 t)m(t), \text{ or} \\ &= \exp(jP(t - dt) + jP_o + j(W_1 - w_d)t) \end{aligned}$$

where P(t) is any phase modulation which is the same for each transmitted pulse.

As noted, P(t) is a linear FM signal of the form $$P(t) = A + B + Ct^2/2$$

and the desired waveform is generated using waveform generator 12'. In the generator, an input clock 36 operates at a clock rate or frequency on the order of $4(f_1)$. This clock rate is counted down to a submultiple of frequency f1 and this submultiple supplied to converter 26" as its clock pulse. When the converter 26" clock is counted down to any fixed value, an array start is commenced. Operating this way to generate an array start means frequency $f_1$ goes through an integral number of cycles each interpulse period. If the starting phase of frequency $f_1$ is taken to be zero for each transmitted pulse, then $$\begin{aligned} s(t) &= \exp(- \\ &\quad j(A + Cdt^2/2 + P_0 - Bdt) + j(W_1 - W_d - Cdt + B)t + \\ &\quad jCt^2/2) = \exp(j(D + Et + Ft^2/2)) \end{aligned}$$

where D, E, and F are the coefficients of the various powers of (t). For each transmitted pulse, the initial conditions for generator 12', are $$DDP_0 = F(T_c^2)$$

$$DP_0 = E(T_c) + (DDP)/2, \text{ and}$$

$$P_0 = D$$

with $T_c = 1/(4f_1)$ being the input clock period.

Generator 12' functions as a double integrator. Prior to the start pulse, the initial register values $DDP_0$, $DP_0$, $P_0$ are loaded into the registers 38, 40, and 42. After the start pulse, the following steps are performed once each clock cycle.

transmitting output P from integrator 42, the output of the integration section of the generator, to a sine wave look-up table 44;

integrating, at integrator 42, the function $P = P + DP$ to obtain P;

integrating, at integrator 40, the function $DP = DP + DDP$ to obtain DP;

converting the digital value representing the sine wave to an analog value in a digital-to-analog converter 46; and, passing the resultant waveform through a low-pass filter 48 which is bandwidth matched with the output signal bandwidth.

The order of the first three operations above performed by generator 12' can be performed in 6, or 3!, different sequences. That is, any of the three operations can be performed first, one of the two remaining operations second, and the remaining operation last. Regardless of the sequence, at its completion, a double integration will have been performed, and this results in the generation of a linear FM signal. Further, the initial conditions may vary for each of the six different sequences.

Those skilled in the digital logic arts ca readily determine what these conditions should be.

In more detail, generator 12' uses a reference clock input signal to produce an output waveform. This reference signal is supplied as an input to the generator and is counted down to produce an output timing clock signal for use external to the generator; i.e. it is used to control the A/D converter 26' clock. A pulse to "start", or enable the generator is provided at the beginning of a count down cycle, and a "stop" pulse is provided to the generator at completion of the cycle. The generator only starts and stops on the leading edge of the respective "start" or "stop" pulse.

The registers comprising input 38, and integrators 40, 42 are respectively initialized with the starting values of the output phase, the output phase first derivative and the output phase second derivative. Upon receipt of the enable, or "start" pulse, the generator, upon occurrence of the leading edge of the next clock pulse, performs the following:

it provides an output of the initialized phase;

it performs an addition of the initialized phase with the first derivative thereof (the first derivative being multiplied by the clock interval) to produce the next phase value; and, it performs an addition of the initialized phase rate with the second derivative thereof (this derivative also being multiplied by the clock interval) to produce the next phase rate value.

These operations all occur at the clock rate and continue until a "stop" pulse is received by the generator.

Generator 12" is also used to generate the reference waveform used by receiver 20' in a stretch receiver mode. This reference waveform starts at $t=T_2$ and is expressed as $$y(t) = exp(jW_1 t + jP(t - T_1))$$

If $s = t - T_2$, then for $O < s < T_p + T_w$, the terms representing the respective phase angles may be collected as $$\begin{aligned} y(s) &= exp(j(W_1 T_2 + A + C(T_w/2)^2/2 - BT_w/2) + \\ &\quad j(W_1 - CT_w/2 + B)s + jCs^2/2) \\ &= exp(j(D + Es + Fs^2/2)) \end{aligned}$$

The initial conditions for generator 12' are computed from D, E, and F using the same equations used for the transmitter waveform equations.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. In a radar system in which a coherent clock reference signal is used to generate a linear FM signal which is radiated from a transmitter located on a radar system platform, strikes an object, and has a portion thereof reflected back toward the platform, received by the system and thereafter processed to obtain information about the object, this processing including periodically sampling the received signal, a waveform generator whose output signal automatically compensates the received signal both with respect to any difference between the leading edge of the sampled portion of the signal and the leading edge of a sampling window (i.e., range walk) and any change in the received pulse-to-pulse phase and frequency due to motion of the platform occurring between transmission of one pulse and the next (i.e. "focusing"), the generator having means for generating a linear FM reference signal whose signal characteristics account for both any time difference between the leading edge of a sampling window and the leading edge of the sampled portion of the signal and any change in the received pulse-to-pulse phase and frequency due to motion of the platform occurring between the transmission of one pulse and the next.

2. The generator of claim 1 wherein the waveform generator includes integration means for performing a multiple integration to obtain the phase of an output signal supplied by it.

3. The generator of claim 2 wherein the integration means includes means for performing a first integration and a second integration of the second derivative of the phase of the output signal.

4. The generator of claim 3 further including means for combining an initial phase, a first integrated phase rate phase, and a second integrated signal phase, in any combination, to produce a resultant signal.

5. The generator of claim 4 further including output means responsive to the resultant signal for producing a linear FM reference signal.

6. The generator of claim 5 wherein the output means includes a look-up table having as an input the signal output of the combining means the output means producing a digital signal representing a modulated sine wave whose signal characteristics are a function of the input.

7. The generator of claim 6 wherein the output means further includes a digital-to-analog converter for converting the digital signal to the modulated sine wave.

8. The generator of claim 7 wherein the output means further includes filter means for matching the bandwith of the modulated sine wave with that of the transmitted signal.

9. A waveform generator responsive to a reference signal input for producing an output waveform comprising:

means to which the reference signal is supplied;

means for performing a multiple integration to obtain the phase of the output waveform; and, means for combining the results of the integration with a starting phase to produce the resultant waveform.

10. The generator of claim 9 wherein the integration means performs a first integration and a second integration to obtain the phase of the output waveform.

11. The generator of claim 10 wherein the combining means includes means for combining an initial phase, a first integrated signal phase rate, and a second integrated signal phase second derivative, in any combination thereof.

12. The generator of claim 11 further including output means comprising a look-up table having as an input the output of the combining means and as an output a digital signal representing a sine wave whose signal characteristics are a function of the input.

13. The generator of claim 12 wherein the output means further includes a digital-to-analog converter for converting the digital signal to the sine wave, and filter means for bandwidth matching the sine wave with a using system's requirements.

14. A method of generating a waveform comprising:

supplying to a waveform generator an initial phase;

performing a multiple integration of the phase's first and second derivatives;

combining, in any combination, the initial phase, and the derivative's from each stage of the integration to produce a resultant signal; and, deriving from the resultant signal an output waveform by providing the resultant signal to a sine wave look-up table, locating in the table a digital value representing a sine wave having a specified set of characteristics, converting the digital value representing the sine wave to an analog sine wave signal, and passing the resultant waveform through a bandpass for bandwidth matching with a signal transmission system.

15. The method of claim 14 wherein performing the multiple integration of the reference phase includes performing respective first and second integrations thereof.

16. The method of claim 14 for generating a linear FM waveform.

17. In a radar system in which a coherent clock reference signal is used to generate a linear FM signal which is radiated from a transmitter located on a radar system platform, strikes an object, and has a portion thereof reflected back toward the platform, received by the system and thereafter processed to obtain information about the object, this processing including periodically sampling the received signal, a waveform generator whose output signal automatically compensates the received signal both with respect to any difference between the leading edge of the sampled portion of the signal and the leading edge of a sampling window (i.e., range walk) and any change in the received pulse-to-pulse phase and frequency due to motion of the platform occurring between transmission of one pulse and the next (i.e. "focusing"), the generator having means for generating a linear FM reference signal whose signal characteristics account for both any time difference between the leading edge of a sampling window and the leading edge of the sampled portion of the signal and any change in the received pulse-to-pulse phase and frequency due to motion of the platform occurring between the transmission of one pulse and the next.

18. The improvement of claim 17 further including means for supplying a reference signal to the generator means, the generator means including integration means for obtaining the phase of the output signal.

19. The improvement of claim 18 wherein the integration means includes means for performing a first integration and a second integration to obtain the phase of the output signal.

20. The improvement of claim 19 further including means for processing the received, automatically compensated signal.

* * * * *

UNITED STATES PATENT AND TRADEMARK OFFICE
CERTIFICATE OF CORRECTION

PATENT NO. : 5,055,850
DATED : October 8, 1991
INVENTOR(S) : David Lamper et al

It is certified that error appears in the above—identified patent and that said Letters Patent is hereby corrected as shown below:

Col 4 Line 53 is "r(T)" should be --$r(T_1)$--;
Col 4 line 56 is "r(T)" should be --$r(T_1)$--.

Signed and Sealed this

Seventeenth Day of January, 1995

Attest:

BRUCE LEHMAN

Attesting Officer      Commissioner of Patents and Trademarks